March 1, 1966     H. W. HEISTERKAMP     3,237,685

FLUID HEATED ROLL

Filed Nov. 29, 1961

INVENTOR.
Herbert W. Heisterkamp
BY Stephen J. Rudy
Jerome Rudy
Attys

United States Patent Office 3,237,685
Patented Mar. 1, 1966

3,237,685
FLUID HEATED ROLL
Herbert W. Heisterkamp, University Heights, Ohio, assignor to The Dow Chemical Company, Midland, Mich., a corporation of Delaware
Filed Nov. 29, 1961, Ser. No. 155,762
4 Claims. (Cl. 165—90)

This invention relates to a heated roll for the drying of inks, or adhesive coatings, applied to a flexible film surface.

A prime objective in the design of heater rolls for the stated purpose, is to obtain a uniformly heated surface for optimum drying effect. Rolls which are heated to unequal temperatures throughout, are subjected to differential expansion which causes roll distortion making them unacceptable for certain applications.

One type of roll in current use is heated by steam condensation, which generally maintains substantially uniform temperature throughout the roll. However, a basic problem in the use of such a steam heated roll for many drying applications, is that surface temperatures often must be held below the atmospheric boiling point of water, for example, between 120° F. and 130° F. To maintain such a temperature range with steam, calls for a vacuum within the roll at a level of about 3.5″ Hg abs. This requires the use of high vacuum system for removing the condensate from this roll, and in addition, problems of inward air leakage through rotary joints must be overcome, all of which make this type of heated roll expensive to install and maintain in good working condition.

Another type of roll often employed for the stated purpose, is a water heated type. The usual construction of such a roll takes the form of concentric cylinders in spaced relation to form a cylindrical shell supported at each end by journal means. Water flows through one journal, through the shell, and out of the outer journal. Modifications of this design are often made to increase water velocity in the space between the cylinders, and to support the outer cylinder. This is done with filler bars between the cylinders which form a channel for water flow. The channel may take the form of a labyrinth with a reversal of water direction after each rotation with a series of such reversals across the width of the roll. It may also take the form of one or several independent spiral grooves forming passages around and across the roll. To achieve flow rates as required for high heat transfer, large bore journals, as well as relatively large piping, pump and heat exchangers are required, all of which detract from the desirability of such type of heated roll in various applications.

The heated roll of the invention, which is of the water heated type, avoids many of the disadvantages and shortcomings of prior art rolls. Briefly, said roll includes means to introduce relatively small quantities of heated water at elevated pressure into and out of the roll. The kinetic energy of such liquid is utilized to cause recirculation of the liquid in the roll, and may, if desired, be drawn upon for effecting rotation of the roll. A velocity to static conversion nozzle is arranged in the roll supporting shaft. It will be realized from the following disclosure that the heated roll of the invention represents a distinct improvement in the art.

The main object of this invention is to provide an improvement in a heated roll used for drying of inks and adhesive coatings applied to a flexible film surface.

A more specific object is to provide a heated roll having means to introduce relatively small quantities of heated water at elevated pressure into and out of the roll.

Still another object of the invention is to provide a heated roll in which the kinetic energy of the liquid supplied to the roll, is utilized to cause recirculation of liquid in the roll.

A further object is to provide a heated roll with means whereby energy may be drawn from the input liquid for rotation of the roll.

Lastly, an object of the invention is to provide a heated roll which will give long and satisfactory service, with minimum installation and maintenance costs.

These and further objects and features of the invention will become more apparent from the following description and accompanying drawing wherein.

Figure 1:
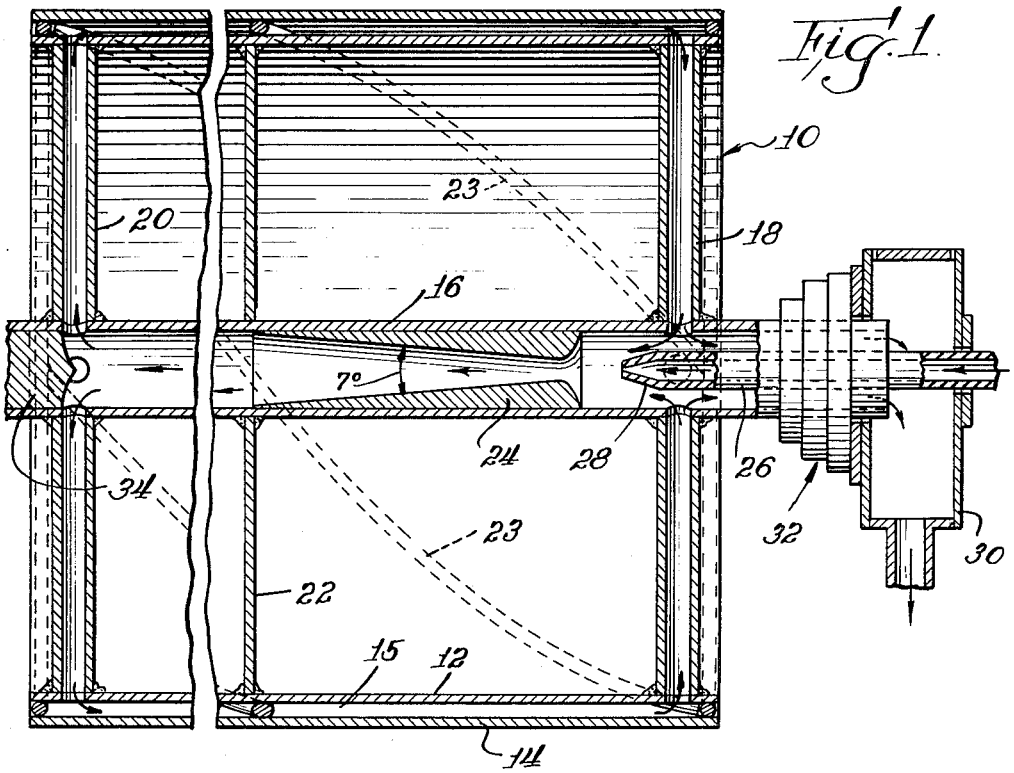
FIG. 1 is a broken section view of a heated roll illustration of an embodiment of the invention.

Referring now to the drawing, the numeral 10 identifies a heated roll assemblage which basically includes an inner cylinder 12, an outer cylinder 14, arranged in spaced relation to the inner cylinder to provide an annular space 15, a hollow shaft 16, and a fluid conducting means, preferably in the form of a plurality of hollow spokes, or radial tubes 18 and 20 (five at each end of the assemblage) which are arranged to interconnect the shaft and the inner cylinder so that the latter is maintained in concentric spaced relation to the shaft. The spokes 20 are adapted to convey heated liquid, such as water, from the shaft 16 to the space 15, from whence it flows through the spokes 18 back into the shaft. A plurality of disc-like elements 22 are arranged upon the shaft 16, which elements are affixed about their outer edge to the inner cylinder 12 to assist in the support thereof. Filler bars 23 are spirally arranged in the annular space 15, which bars support the outer cylinder 14 upon the inner cylinder 12, and which cause a spirally-directed flow of fluid as it passes through the annular space 15.

Positioned within the shaft 16 is a fluid energy converting means for converting kinetic energy to static energy, which is preferably in the form of a nozzle piece 24, the inner surface of the nozzle piece having a venturi-type configuration. An inlet nozzle pipe 26 is arranged to extend into one end of the shaft in spaced relation to and in axial alignment with the nozzle piece 24. The nozzle pipe 26, which has an outer diameter substantially less than the inner diameter of the shaft 16, is formed with a tapered end to provide an orifice 28 which is positioned inward slightly past the openings of the tubes 18. Means (not shown) are arranged to deliver a high velocity, heated liquid, to the nozzle pipe 26, which liquid is jetted from the end 28 into the nozzle piece 24. Such action causes a circulation of liquid through the flow circuit defined by the shaft 16, spokes 20, inner and outer cylinders 12 and 14 respectively, and spokes 18. A certain amount of liquid is recirculated through said flow circuit, the remainder of which will flow past the nozzle pipe 26 out of the end of the shaft 16 into a fluid return receptacle 30, from which it will return to exterior pump means (not shown).

A bearing means 32 is provided for rotatably supporting one end of the shaft 16, other bearing means (not shown) being arranged for the support of the other end of the shaft. A flow diverting plug 34, positioned in the shaft 16, is adapted to direct liquid flow into the spokes 20.

From the foregoing, it will be seen that high velocity liquid directed into the nozzle piece 24 will flow through the liquid circuit, i.e., shaft 16, spokes 20, annular space 15, and spokes 18, some of said liquid being recirculated, while the remainder will flow out of the shaft 16 into the return flow receptacle 30.

Figure 2:
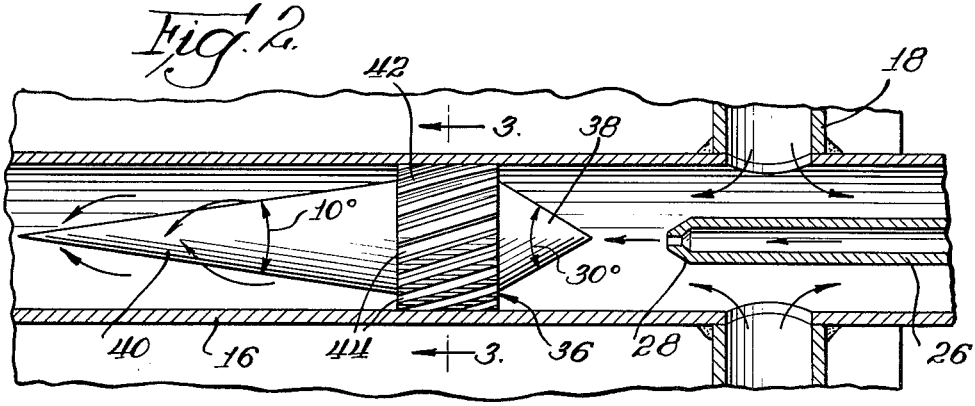
FIG. 2 is a fragmentary view, in partial section, illustrating a modified type of nozzle means.
Figure 3:
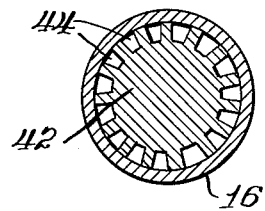
FIG. 3 is a section view generally as seen along line 3—3 in FIG. 2.

A modified type of nozzle piece is shown in FIG. 2. As seen therein, a nozzle piece 36, which is an inversion of the nozzle piece 24, comprises a conical upstream portion, or nosepiece 38, a downstream portion, or trailing member 40, and a mid-portion 42 in which are formed a plurality of equally spaced spiral slots 44. The outer diameter of the mid-portion is such as to provide a tight fit inside the shaft. The included angle of the upstream portion 38 is preferably 30°, while that of the downstream portion 40, is preferably 10°. The slots 44, of which in the given example, there are 15 in number, have a 20° spiral. The nozzle piece 36 may be used in a heated roll 10 in place of the nozzle piece 24.

In designing a heated roll embodying the principles of the invention, design criteria, such as, roll diameter, roll length, construction materials, and total heat release are established by the job requirements. These facts must be known to establish operating requirements, however, they have no bearing on the principles involved as there are no limitations in this regard.

The depth or thickness of the annular space 15, is determined chiefly by practical limits of manufacture. This should be held reasonably small but large enough so that the usual variations encountered within limits of manufacturing tolerances do not represent more than about 5% variation in depth. In small diameter rolls, such dimensions may be as small as ¼″, while in large diameter rolls a ½″ dimension may be more practical.

The desired mass flow rate through the annular space 15 is determined principally by the total maximum heat release from the roll and the allowable temperature gradient across the roll length. Since a prime requisite is to maintain close temperature distribution, flow rate is held as high as feasible. When water is used as the heating medium, the following formula may be used:

$$\text{Mass flow rate (g.p.m.)} = \frac{\text{Total heat release (B.t.u. hr.)}}{500 \times \text{Temp. rise in } °\text{F.}}$$

To maintain good heat transfer rate, water velocity should be held above 2 feet per second and generally below 5 feet per second. Higher flow rates give higher heat transfer rates and reduce fouling tendencies up to a point of diminishing return. The heat transfer rate through the material in contact with the roll or the film coefficient between the roll surface and the material, is generally the weakest link in the chain when considering the overall heat transfer result. The internal cross section area of the shaft 16 as well as the total internal cross section area of the spokes 18 and 20, should be substantially equal to the cross section area of the annular space 15, to insure equal flow velocity throughout the system, except through the nozzle piece 24, or 36.

With the physical dimensions of the heated roll and the flow rate established, the frictional resistance of the circulating system can be established using standardized tables. Lift, represented by the radius of the roll, need not be considered as this is balanced by a comparable fall. The nozzle piece 24 or 36, must be capable of developing a head to match the frictional resistance at the design flow rate. The formula for determining the throat diameter of the nozzle piece 24 is:

$$\text{Throat dia. (inches)} = \sqrt{\frac{0.0482 \times \text{Flow rate (g.p.m.)}}{\sqrt{H \text{ (ft. H}_2\text{O)}}}}$$

Immediately downstream of the throat of the nozzle piece 24, there must be a gradual and smooth enlargement of flow area. A 3½° taper, or 7° included angle is generally acceptable. The entrance to the nozzle piece throat should have a well rounded contour; a radius equal to one-half the difference between the internal diameter of the shaft 16 and the throat diameter of the nozzle piece 24, is generally satisfactory. A nozzle piece made in accordance with such criteria is effective in converting between 95% to 97% of the throat velocity pressure into static pressure.

The quantity and pressure level of the primary water supply is determined by the energy required to cause the desired recirculation rate. A small quantity at relatively high pressure will accomplish the same result as a larger quantity at lower head. Theoretically, the mass flow rate of primary water times its head at the nozzle piece 24, must be equal to the mass flow rate within the roll times its resistance head. Efficiency of injection and efficiency of static conversion by the nozzle piece 24 must be considered. The required energy in the primary stream must be higher to compensate for these losses. Since the energy in the recirculated stream returning to the nozzle inlet is not lost, the efficiency of the heater roll under consideration can be quite high, 80% or higher being commonplace and an accepted value to use.

The quantity of primary water is determined by available temperature of the source compared with the maximum design temperature of the fluid within the roll and the maximum heat release. The following formula applies:

Primary water (g.p.m.)
$$= \frac{\text{Max. heat release (b.t.u.) (hr.)}}{500 \times \text{Allowable temp. drop (°F.)}}$$

The energy required in the primary stream, expressed in ft. H₂O is:

Primary fluid head (ft. H₂O)
$$= \frac{\text{Roll flow rate (g.p.m.) flow head (ft.)}}{0.80 \times \text{Primary flow rate (g.p.m.)}}$$

The diameter of the inlet pipe orifice 28, can be determined in accordance with the following formula:

$$\text{Orifice dia. (inches)} = \sqrt{\frac{0.0532 \times \text{g.p.m.}}{\sqrt{H \text{ (ft. H}_2\text{O)}}}}$$

Calculations based upon the foregoing formulae can be used to establish recirculation rate. In most, if not all applications, there is no reason to limit recirculation to any particular level, however, it is desirable to have the highest possible rate. Recirculation may be increased by the addition of more primary water, by increasing the supply pressure, or by both means. The relationship between nozzle throat diameter and system resistance remains fixed for any recirculation rate.

The basic principle of both nozzle pieces 24 and 36 is similar, the throat area of either type being determined by the quantity of water and the flow head which must be developed. In the nozzle piece 36, which is an inversion of nozzle piece 24, the throat area is that of the slots 44. The nosepiece 38 accomplishes a smooth entry into the throat, or mid-portion 42, while the trailing member 40 provides a gradual enlargement of nozzle cross sectional area.

The turning force of the nozzle piece 36 is determined by throat velocity, fluid mass flow rate, shape of impellor as provided by the spiral slots 44, and the effective diameter of the impellor. Standard water wheel turbine formulae may be applied for determining a satisfactory design. Knowledge of the turning friction and desired torque output are of course basic to formulation of design dimensions.

The nozzle piece 36 may be used to control rotative force and roll speed by controlling either the flow rate or pressure, or both of these components of the primary fluid stream. It must be recognized, however, that such control will effect the recirculation rate. In most applications, however, the recirculation rate, if held high enough for good performance at maximum speed and torque requirements, will be adequate for the lower heat release that results at slower drum speeds.

It will be obvious that a heated roll made in accordance with the foregoing disclosure, will satisfy the objectives set forth hereinbefore.

It will also be apparent that the roll may be used, with little or no structural change, as a chilling roll wherein cold fluid is used instead of hot fluid. Under either conditions of operation, i.e., heating or chilling, it will be obvious that the roll will function as a heat-exchanging means.

The foregoing description has been given in detail without though of limitation since the inventive principles involved are capable of assuming other forms without departing from the spirit of the invention or the scope of the following claims.

What is claimed is:

1. A revolvable liquid heated roll assemblage whereby the kinetic energy of the liquid supplied to the roll is also utilized to cause a recirculation of liquid in the roll comprising, in combination, an inner cylinder an outer cylinder arranged in spaced relation to said inner cylinder to provide an annular space, a hollow shaft, fluid conducting means interconnecting the cavity of said shaft and said annular space and maintaining said shaft in concentric spaced relation to the inner cylinder, some of said conducting means constituting return means providing re-circulating openings leading into said hollow shaft, a nozzle piece positioned within the cavity of said shaft, said nozzle piece being adapted to convert the kinetic energy of the liquid supplied to the roll into static energy, an inlet nozzle extending into one end of the shaft in spaced relation to and in axial alignment with the nozzle piece and formed to provide an orifice which is positioned inward past the openings of said return conducting means between said shaft and said annular space, means to deliver a high velocity, heated fluid to said inlet nozzle and a fluid return receptacle communicating with said shaft at a point outward of the inlet nozzle and recirculating openings.

2. The revolvable liquid heated roll assemblage of claim 1 wherein said fluid conducting means comprises a plurality of radial spokes arranged upon the shaft and toward either end of the cylinders for the support thereof, said radial spokes being adapted to form part of a liquid flow circuit extending through the shaft and said annular space.

3. The revolvable liquid heated roll assemblage of claim 1 wherein a flow diverting plug is positioned in the cavity of the shaft to direct liquid flowing from said nozzle piece into said fluid conducting means at one end of said roll.

4. The revolvable liquid heated roll assemblage of claim 1 wherein said nozzle piece has a venturi surface configuration.

References Cited by the Examiner

UNITED STATES PATENTS

| 398,878 | 3/1889 | Burnett | 165—108 X |
|---|---|---|---|
| 1,526,961 | 2/1925 | Burrows | 165—108 |
| 1,738,489 | 12/1929 | Williams | 158—117.5 |
| 2,582,365 | 1/1952 | Westphal. | |
| 3,098,110 | 7/1963 | Davey et al. | 165—90 X |

FOREIGN PATENTS 512,512  11/1930  Germany.

FREDERICK L. MATTESON, JR., *Primary Examiner.*

CHARLES SUKALO, *Examiner.*